United States Patent [19]
Bacina et al.

[11] Patent Number: 5,746,474
[45] Date of Patent: May 5, 1998

[54] BODY PANEL REINFORCEMENT

[75] Inventors: Paul Raymond Bacina, Livonia; John Jude Fusco, White Lake, both of Mich.

[73] Assignee: Ford Global Technologies, Inc., Dearborn, Mich.

[21] Appl. No.: 122,970

[22] Filed: Sep. 17, 1993

[51] Int. Cl.$^6$ ................................................ B62D 25/16
[52] U.S. Cl. ........................................ 296/191; 296/198
[58] Field of Search ........................... 296/187, 191, 296/198; 29/897.2

[56] References Cited

U.S. PATENT DOCUMENTS

| | | | |
|---|---|---|---|
| 2,383,029 | 8/1945 | Ulrich | 296/198 |
| 4,366,530 | 12/1982 | Milhous | 296/187 X |
| 4,848,835 | 7/1989 | DeRees | 296/187 X |
| 5,104,682 | 4/1992 | Nakahama et al. | 427/27 |

FOREIGN PATENT DOCUMENTS

| | | | |
|---|---|---|---|
| 0372987 | 6/1990 | European Pat. Off. | 296/901 |
| 1923943 | 11/1970 | Germany | 296/901 |

*Primary Examiner*—Dennis H. Pedder
*Attorney, Agent, or Firm*—Daniel M. Stock

[57] ABSTRACT

A reinforcement configuration is provided for an automotive body panel which is particularly useful in the reinforcement of vertical planar surfaces through which tooling holes are formed. In the invention reinforcement, a depression is formed about a tooling hole which includes certain lower surfaces formed to avoid the funneling of liquid coating such as paint which are typically applied to the vertically extending surface and the production of automotive vehicle bodies. Funneling is prevented either through providing a surface dispersing vertically running paint or by providing a reservoir for collecting vertically running paint.

13 Claims, 1 Drawing Sheet

U.S. Patent
May 5, 1998
5,746,474
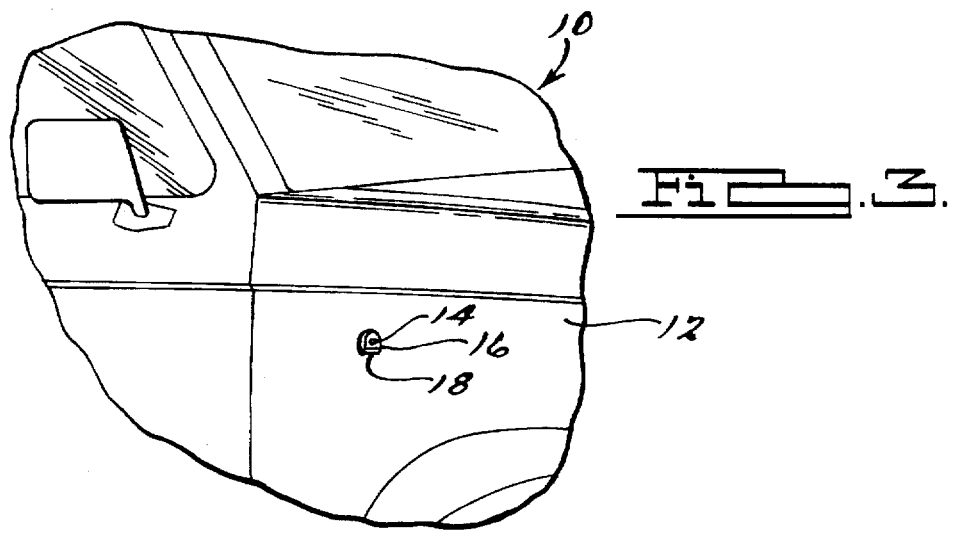
Fig. 3.
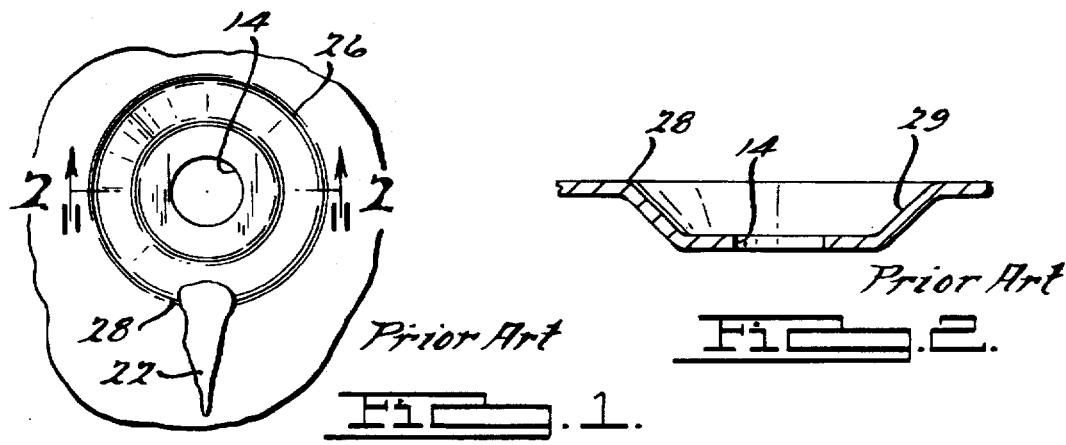
Fig. 1. Prior Art
Fig. 2. Prior Art
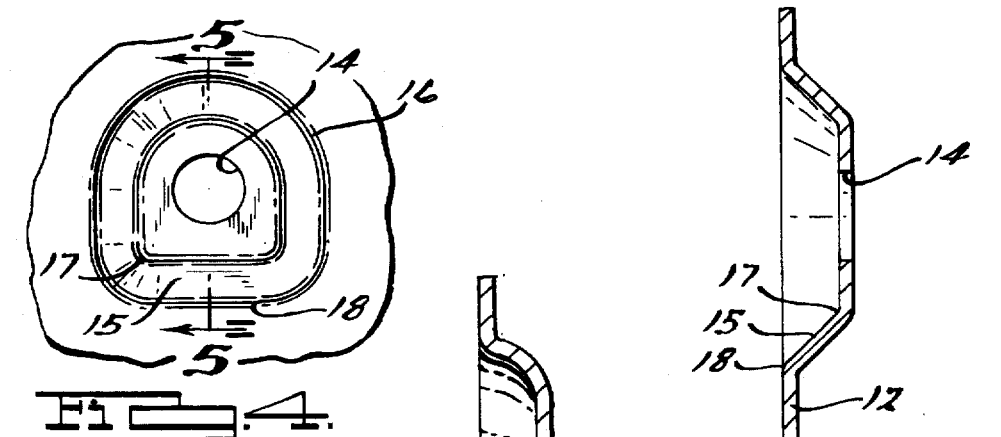
Fig. 4.
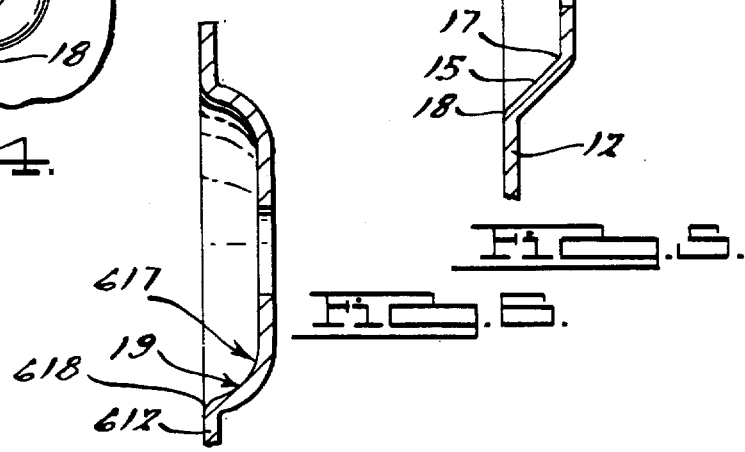
Fig. 5.
Fig. 6.

BODY PANEL REINFORCEMENT

BACKGROUND OF THE INVENTION

1. Field of the Invention

The present invention relates generally to the painting of automotive body panels and to configurations for stamping such panels.

2. Prior Art

In the manufacture of motor vehicles it is necessary to locate and measure body panels during the assembly process. One method for effecting such measurement consists of using a local surface discontinuity, such as a tooling hole, as a locating surface to position the panel on the vehicle frame, as well as to determine panel and component dimensional tolerances relative to the tooling hole. However, there are drawbacks associated with use of tooling holes, one of which is a weakening of the local area of the panel. To regain strength and stiffness adjacent such a tooling hole a reinforcing circular depression encompassing the hole is often stamped into the sheet metal. This can present problems, however, when a liquid surface coating such as paint is applied to the panel as part of the automotive assembly process. When the stamped depression is located on a vertical surface lower portions of the depression act as a funnel, collecting paint at its lower edge which in turn begins to drip out of the depression causing an imperfection in the form of a paint run. To remove these imperfections the area must be hand sanded and the application of a second coat of paint must be carefully monitored. This adversely affects the time and cost of the vehicle assembly process.

One approach to preventing paint runs is illustrated in U.S. Pat. No. 5,104,682 to Nakahama et al. in which a four step paint application process is disclosed. In an effort to reduce paint runs the disclosed process requires rotation of the vehicle body about its horizontal longitudinal axis at a rate such that "the paint sprayed is not caused to move to a large extent due to gravity." Implementation of the four step process is economically impractical for the mass production of vehicles because the process is time consuming, and costly. It requires a large initial investment for equipment to rotate vehicle, adds steps to the assembly process, and requires more employee supervision.

SUMMARY OF THE INVENTION

Responsive to the deficiencies of the prior art process the present invention provides a solution for the prevention of paint runs which does not require modification of the current paint application process or vehicle assembly process. Altering the circular configuration of a stamped reinforcing depression which encompasses the tooling hole to a "tombstone" configuration provides a simple, reliable method for the prevention of paint runs.

According to the present invention, a lower horizontal surface for the "tombstone" configuration prevents funneling by dispersing excess paint along a larger surface, therefore avoiding a drip/run.

According to an alternate embodiment of the present invention the lower horizontal edge and an inner edge of the "tombstone" act as a reservoir to contain paint, thus avoiding a paint run.

According to one feature of the present invention a body panel is provided which includes a reinforcement that is configured to define a nonfunneling surface proximate its lower terminus for distributing paint.

According to another feature of the present invention a body panel is provided which includes a reinforcement that is configured to define a reservoir proximate its lower terminus for collecting paint.

BRIEF DESCRIPTION OF THE DRAWINGS

Other advantages and features of the present invention will be apparent to those skilled in the automotive body arts upon reading the following description with reference to the accompanying drawings in which:

FIG. 1 is a partial perspective view of a vehicle showing the present invention;

FIG. 2 is a front view of the prior art;

FIG. 3 is a cross sectional view taken along line 3—3 of FIG. 2;

FIG. 4 is a front view of the present invention;

FIG. 5 is a vertical cross sectional view taken along line 5—5 of FIG. 4; and

FIG. 6 is a vertical cross sectional view similar to FIG. 5 of an alternate embodiment of the present invention.

DESCRIPTION OF THE PREFERRED EMBODIMENT

During the assembly of a motor vehicle it is the practice to create tooling holes in various body panels for the purpose of fixturing panels and measuring tolerances of panels and vehicle components relative to each other and to the tooling hole itself. Formation of tooling holes occurs during the sheet metal stamping process. The body panel is exactly located on a punch press and the tooling hole and an encompassing reinforcing depression of circular configuration are formed in one mechanical operation.

FIG. 3 illustrates a partial perspective of an automobile 10 with a body panel such as a fender 12 including a tooling hole 14 and a tombstone shaped depression 16. Tombstone depression 16 serves to maintain the structural integrity of the body panel surrounding a tooling hole 14 and is operative to prevent excess paint from dripping from the tombstone shaped depression 16 subsequent to paint application as will be later described.

An illustration of past practice in the formation of body panel tooling holes is shown in FIG. 1, which illustrates the tooling hole 14 encompassed by a circular stamped depression 26 with lower edge 28 and displaying a paint run 22 which occurs due to the combination of a vertical surface, the force of gravity acting on the paint, and the circular configuration of the stamped depression 26 which acts as a funnel causing paint to flow to lower edge 28. As the paint collects at lower edge 28 it begins to form a run 22, which must be removed by hand sanding and careful repainting prior to delivery of the vehicle.

This disadvantage is overcome in the present invention as shown in FIG. 4 which illustrates the present invention configuration of the tooling hole 14 encompassed by the reinforcing tombstone shaped depression 16, having an inner edge 17, lower edge 18 and canted surface 15 which is bounded by the lower horizontal edge 18 and inner edge 17 to define a non funneling surface 13. As may best be seen in FIG. 5 excess paint from the paint application process is distributed laterally to run vertically along the canted surface 15 perpendicular to the generally horizontal edge 18.

An alternate embodiment of the present invention is depicted in FIG. 6 in which features similar to FIG. 5 are preceded by the number 6, reservoir 19 is formed by lower edge 618 sloping inward toward the vehicle centerline to inner edge 617, lower edge 618 remaining flush with fender 612. Reservoir 19 serves to contain excess paint which may run down the vertical surface during the paint application process while dispersing the vertically running paint as does the configuration of FIGS. 4 and 5.

While the configurations described the tooling hole 14 with tombstone shaped depression 18 is located on the front vertical side panel of automobile 10, however, it may be located on any panel of the vehicle for the purposes of preventing paint runs. Also, a tombstone shaped depression is operative without the tooling hole. As taught by this invention, any reinforcement or depression containing a nonfunneling lower surface between its boundary surfaces may be employed for the prevention of paint runs from external surface discontinuities.

Having described a preferred embodiment of our invention, what we claim and desire to secure by U.S. Letters Patent is:

1. A reinforcement for an automotive body panel positioned in vertically extending orientation for receiving a liquid surface coating thereon, the body panel including a generally vertically extending exterior surface, the reinforcement comprising;

means defining a depression on the surface, said depression having a portion parallel to said body panel and imperforate canted portions extending between said parallel portion and said exterior surface; and means defining a nonfunneling surface proximate the lower terminus of said depression for collecting excess liquid surface coating applied to the panel and for preventing the liquid surface coating from running onto surfaces directly beneath said reinforcement.

2. A reinforcement for an automotive body panel as defined in claim 1 wherein the reinforcement includes a tooling hole formed through said parallel portion and being the only aperture formed through the depression parallel portion and the depression generally symmetrically surrounds the tooling hole.

3. A reinforcement for an automotive body panel as defined in claim 1 wherein the depression includes a generally horizontal lower edge.

4. A reinforcement for an automotive body panel positioned in vertically extending orientation for receiving a paint coating thereon, the body panel including a generally vertically extending exterior surface, the reinforcement comprising;

means defining a depression on the surface, said depression having a portion parallel to said body panel and imperforate canted portions extending between said parallel portion and said exterior surface; and means defining a nonfunneling surface proximate the lower terminus of said depression for collecting excess paint coating applied to the panel and for preventing the paint coating from running onto surfaces directly beneath said reinforcement.

5. A reinforcement for an automotive body panel as defined in claim 1 wherein the depression comprises an upper portion having an arcuate edge and a lower portion having a generally horizontal edge with rounded corners, the lower edge of said reinforcing surface depression defining a nonfunneling surface operative to prevent the liquid surface coating from running onto the panel surface during the application of the liquid surface coating on the body panel.

6. A reinforcement for an automotive body panel as defined in claim 5, wherein said nonfunneling surface is a canted surface defined by the lower edge of the depression, said nonfunneling surface being operative to disperse the liquid surface coating onto said canted surface to avoid paint funneling to the surface beneath the reinforcing depression.

7. An automotive body panel as defined in claim 6, wherein the nonfunneling surface is of sufficient area to disperse the liquid surface coating flowing from above the surface depression.

8. A reinforcement for an automotive body panel as defined in claim 5 wherein the reinforcement includes a tooling hole formed through said parallel portion and being the only aperture formed through the depression parallel portion and the depression generally symmetrically surrounds the tooling hole.

9. A reinforcement for an automotive body panel as defined in claim 5 wherein the depression includes a generally horizontal lower edge.

10. A reinforcement for an automotive body panel as defined in claim 5 wherein said nonfunneling surface is a reservoir operative to contain paint and to prevent paint runs onto the panel surface from the application of paint on the body panel.

11. An automotive body panel as defined in claim 10, wherein the reservoir is of sufficient depth to contain and prevent paint from funneling to the surface beneath reinforcing depression.

12. A reinforcement for an automotive body panel as defined in claim 6 wherein the reinforcement includes a tooling hole formed through said parallel portion and being the only aperture formed through the depression parallel portion and the depression generally symmetrically surrounds the tooling hole.

13. A reinforcement for an automotive body panel as defined in claim 6 wherein the depression includes a generally horizontal lower edge.

* * * * *